US005740054A

United States Patent [19]

Dürr et al.

[11] Patent Number: 5,740,054

[45] Date of Patent: Apr. 14, 1998

[54] CUTTING-REGISTER FEEDBACK-CONTROL DEVICE ON CROSS-CUTTERS OF ROTARY PRINTING PRESSES

[75] Inventors: Wolfgang Dürr, Meckesheim; Gerog Rössler, Angelbachtal; Rolf Spilz, Mannheim, all of Germany

[73] Assignee: Heidelberger Druckmaschinen AG, Heidelberg, Germany

[21] Appl. No.: 709,322

[22] Filed: Sep. 4, 1996

Related U.S. Application Data

[63] Continuation of Ser. No. 151,298, Nov. 12, 1993, abandoned.

[30] Foreign Application Priority Data

Nov. 13, 1992 [DE] Germany ........................ 42 38 387.0

[51] Int. Cl.[6] ........................ G06F 19/00

[52] U.S. Cl. ........................ 364/469.01; 226/2

[58] Field of Search ........................ 364/469.01, 469.03, 364/471.01, 471.02, 469.04; 226/24, 27, 37, 2; 101/91, 92, 181, 248, 216, 219, 224, 226; 83/74

[56] References Cited

U.S. PATENT DOCUMENTS

| | | | |
|---|---|---|---|
| 2,075,095 | 3/1937 | Cordes | 83/75 |
| 3,490,048 | 1/1970 | McDowell | 327/306 |
| 3,601,587 | 8/1971 | Thiede | 377/17 |
| 4,243,925 | 1/1981 | Gnuechtel | 318/603 |
| 4,426,898 | 1/1984 | Friberg | 83/37 |
| 4,638,732 | 1/1987 | Salazar | 101/91 |
| 4,694,749 | 9/1987 | Takeuchi et al. | 101/426 |
| 4,719,855 | 1/1988 | Cannon et al. | 101/426 |
| 5,016,182 | 5/1991 | Bergland et al. | 364/469 |
| 5,132,911 | 7/1992 | Leader, Jr. et al. | 364/469 |
| 5,251,554 | 10/1993 | Eckert, Jr. et al. | 101/91 |
| 5,361,960 | 11/1994 | Fokos et al. | 226/2 |
| 5,377,587 | 1/1995 | Köbler | 101/233 |

FOREIGN PATENT DOCUMENTS

| | | | |
|---|---|---|---|
| 26 06 164 | 8/1976 | Germany | B26D 5/00 |
| 2751386 | 9/1978 | Germany | G05D 3/06 |
| 33 18 250 | 11/1984 | Germany | B41F 13/00 |
| 3602894 | 5/1989 | Germany | B41F 13/54 |

*Primary Examiner*—Reba I. Elmore
*Assistant Examiner*—Steven R. Garland
*Attorney, Agent, or Firm*—Herbert L. Lerner; Laurence A. Greenberg

[57] ABSTRACT

A cutting-register feedback-control device of a cross-cutter of a rotary printing press for printing on a printing-carrier web, the cross-cutter including a driven cutting cylinder, and the rotary printing press having printing-unit cylinders, drawing devices for the printing-carrier web and positioning devices for adjusting the position of the printing-carrier web, the cutting-register feedback-control device including scanners for scanning markings on the printing-unit cylinders and for scanning the driven cutting cylinder, the scanners being connected to comparison and control circuits operatively connected with the positioning devices for the printing-carrier web so as to effect a correction in a position of the printing-carrier web if there should be an angular deviation between the printing-unit cylinders and the driven cutting cylinder, also being provided are rotary-position sensors, respectively, for the printing-unit cylinders, the drawing devices and the cutting cylinder, and a first control loop for a drive of the drawing devices, the rotary-position sensors for the printing-unit cylinders and for the drawing devices being connected in the first control loop, and a second control loop for a drive of the cutting cylinder formed independently of the first control loop, the rotary-position sensors for the printing-unit cylinders and for the cutting cylinder being connected in the second control loop.

8 Claims, 3 Drawing Sheets

CUTTING-REGISTER FEEDBACK-CONTROL DEVICE ON CROSS-CUTTERS OF ROTARY PRINTING PRESSES

This application is a continuation of application Ser. No. 08/151,298, filed on Nov. 12, 1993, now abandoned.

The invention relates to a cutting-register feedback-control device on a cross-cutter of a rotary printing press for printing on a printing-carrier web, the cross-cutter having a driven cutting cylinder, and the rotary printing press having printing-unit cylinders, the control device including scanners for scanning markings on the printing-unit cylinders and for scanning the driven cutting cylinder and being connected to a comparison and control circuit which act upon positioning devices for the printing-carrier web so as to effect a correction in a position thereof if there should be an angular deviation between the printing-unit cylinder and the cutting cylinder.

A cutting-register compensation device has become known heretofore in the prior art from German Patent 36 02 894 C2. Two printing-unit cylinders which are provided with markings are scanned by scanning devices, and pulses generated in accordance therewith are relayed to a comparison and control circuit. The comparison and control circuit, in turn, receives pulses from a scanning device assigned to a driven cutting cylinder. Depending upon a comparison of the transmitted pulses, a web idler roller, which, for example, as in this German patent, is actuated by a pressure medium, is deflected in order to correct the cutting register. A closed-loop control is not applicable at all, in such a case, because the drives of the printing-unit cylinder and of the cutting cylinder are not subjected to any influence which tends to reduce the deviation to zero. With the application of positioning devices to the printing-carrier web, only the length of the web can be varied by means of the cutting-register compensation device according to the prior art. There is no disclosure in the German patent of any efforts to influence the drive of web-transport pulling or drawing devices.

Proceeding from the foregoing outline of the state of the art, it is an object of the invention to provide a cutting-register feedback-control device on a cross-cutter of a rotary printing press for printing on a printing-carrier web, the cross-cutter being disposed downstream from the printing units of the printing press and having no mechanical connection therewith.

With the foregoing and other objects in view, there is provided, in accordance with the invention, in a cross-cutter of a rotary printing press for printing on a printing-carrier web, the cross-cutter having a driven cutting cylinder, and the rotary printing press having printing-unit cylinders, drawing devices for the printing-carrier web and positioning devices for adjusting the position of the printing-carrier web, a cutting-register feedback-control device including scanners for scanning markings on the printing-unit cylinders and for scanning the driven cutting cylinder, the scanners being connected to comparison and control circuits operatively connected with the positioning devices for the printing-carrier web so as to effect a correction in a position of the printing-carrier web if there should be an angular deviation between the printing-unit cylinders and the driven cutting cylinder, comprising rotary-position sensors, respectively, for the printing-unit cylinders, the drawing devices and the cutting cylinder, and a first control loop for a drive of the drawing devices, the rotary-position sensors for the printing-unit cylinders and for the drawing devices being connected in the first control loop, and a second control loop for a drive of the cutting cylinder formed independently of the first control loop, the rotary-position sensors for the printing-unit cylinders and for the cutting cylinder being connected in the second control loop.

An advantage of this construction is the provision of two independent control loops, both employing, as a common input variable, the absolute angular position of a printing-unit cylinder of the printing press. With two independent control loops, cutting register can be effected by varying the phase position of the cutting cylinder without influencing the rotational speed-dependent web tension. With the aid of the control loops, the torques of the drive motors can be influenced so that, in spite of disturbance variables, such as variations in paper quality, assurance is always provided that the paper web will be cut correctly. In accordance with another feature of the invention, the cutting cylinder is disposed in an open-sheet delivery of the printing press, and another sensor is included for detecting a printed-image position on the printing-carrier web, the other sensor being disposed upstream of the cutting cylinder, as viewed in a travel direction of the printing-carrier web through the printing press for detecting the image position. Should there be a shift in the position of the printed image, it is possible, by means of this optical sensor, to influence immediately an input variable of the control loop for the cutting-cylinder drive, so that a precise cut is always assured.

In accordance with a further feature of the invention, the other sensor, the rotary-position sensor for the cutting cylinder and the rotary-position sensor for the printing-unit cylinders are mutually connected so that a signal $\phi_{opt}$ of the other sensor is feedable to superimposed signals $\phi_{cutting\text{-}actual}$ of the rotary-position sensor for the cutting cylinder and $\phi_{main\text{-}actual}$ of the rotary-position sensor for the printing-unit cylinders.

In accordance with an added feature of the invention, the cutting-register feedback-control device includes means for calculating a rotational speed-dependent difference signal dependent upon a signal $\phi_{main\text{-}actual}$ generatable by the rotary-position sensor of the printing-unit cylinders.

In accordance with an additional feature of the invention, the cutting-register feedback-control device includes means for calculating a rotational speed-dependent difference signal dependent upon the signal $\phi_{main\text{-}actual}$ of the rotary-position sensor for the printing-unit cylinders, and means for combining the signals $\phi_{cutting\text{-}actual}$, $\phi_{main\text{-}actual}$ and $\phi_{opt}$ with the rotational speed-dependent difference signal into an input signal to a node of the second control loop.

In accordance with yet another feature of the invention, the cutting-register feedback-control device includes means for manually preselecting a signal $\phi_{offset}$ representing a phase position of the cutting cylinder as a setting input to the second control loop.

The rotational speed-dependent difference signal has a rising ramp-like form and represents a proportionality constant $K_f$. The difference signal permits the manufacture of products with a cut-off length divisible by a whole number. The capability of effecting a manual setting input $\phi_{offset}$ is of particular importance during the start-up phase. The setting made during the start-up phase may, if necessary, be corrected during the production run.

An input variable for a signal converter is accordingly generated from the enumerated variables: $\phi_{cutting\text{-}actual}$, $\phi_{main\text{-}actual}$, $\phi_{offset}$, $\phi_{opt}$ and the difference signal. The signal converter is followed by a control loop wherein a nominal current $I_{setpoint}$ is permanently compared with an actual current $I_{actual}$. A great advantage thereof is that a signal composed of a multiplicity of input variables can be calculated with very great accuracy as an input variable in order then to serve as a precise reference variable for a current control loop. An angle feedback-control system is consequently superimposed on the feedback control of the motor current.

In accordance with yet a further feature of the invention, the cutting-register feedback-control device includes means for feeding a signal $\phi_{pulling\text{-}actual}$ from the rotary-position sensor for the drawing devices and a signal $\phi_{main\text{-}actual}$ from the rotary-position sensor for the printing-unit cylinders to a node of the first control loop.

In accordance with yet an added feature of the invention, the cutting-register feedback-control device includes means for superimposing a rotational speed-dependent, rising difference signal on the signal $\phi_{main\text{-}actual}$ from the rotary-position sensor for the printing-unit cylinders, and means for feeding a resultant signal thereof to the node.

In accordance with a concomitant feature of the invention, the cutting-register feedback-control device includes a signal converter for the first control loop, means for feeding the resultant signal from the node to the signal converter for converting the resultant signal into a current $I_{setpoint}$, means for outputting the current $I_{setpoint}$ as an input signal to another node after-connected to the signal converter, and means for feeding back to the other node a current $I_{actual}$ of a drive of the drawing devices.

Basically, the foregoing features of the control loop for the pulling or drawing devices ensures the rotational speed-dependent, feedback-controlled maintenance of the tension of the material web being processed.

Other features which are considered as characteristic for the invention are set forth in the appended claims.

Although the invention is illustrated and described herein as embodied in a cutting-register feedback-control device on a cross-cutter of a rotary printing press, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

DETAILED DESCRIPTION

Figure 1:
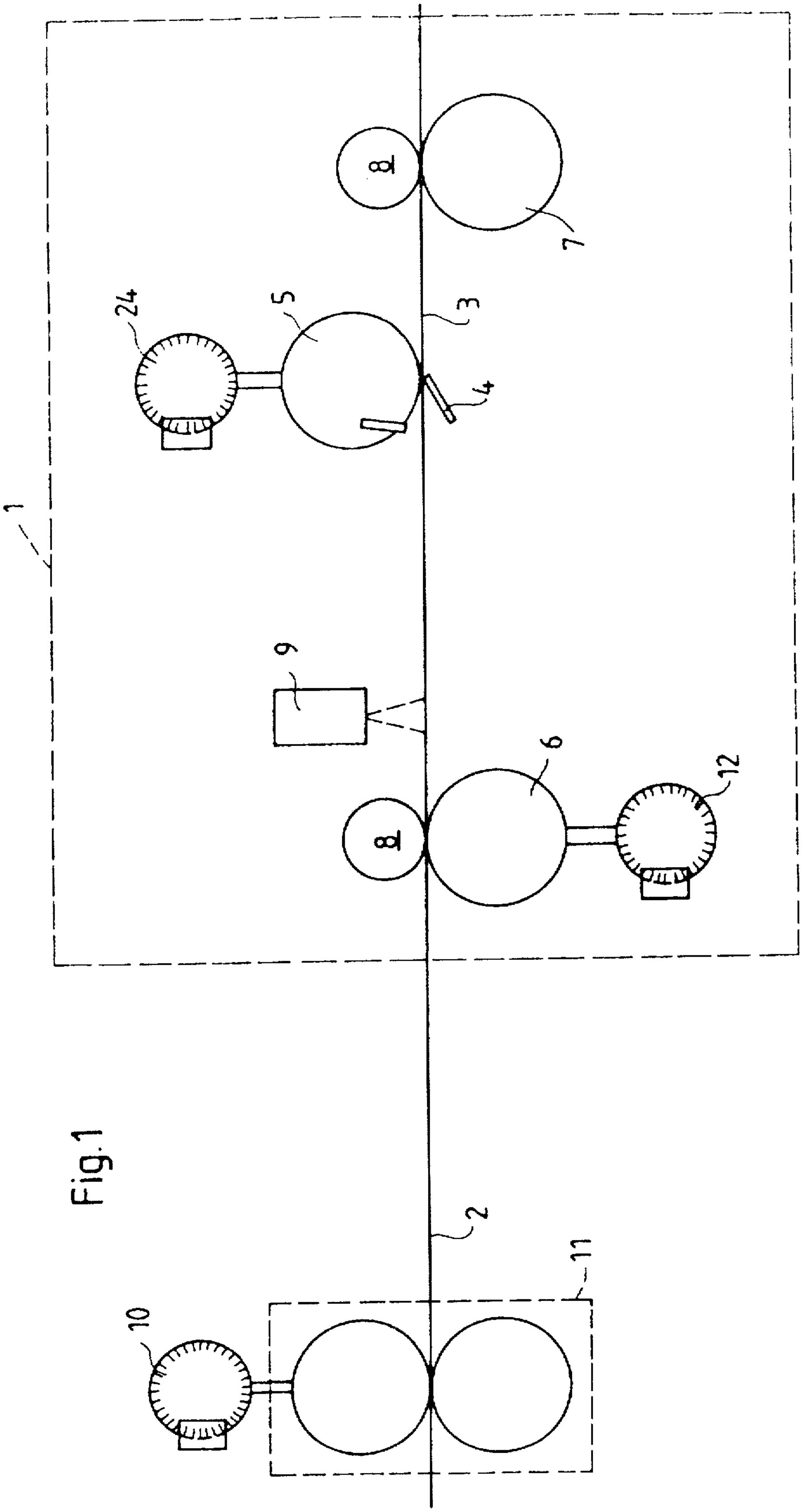
FIG. 1 is a diagrammatic side elevational view of a printing press arrangement which includes an up-line disposed printing unit and a down-line disposed cross-cutter.

Referring now to the drawings and, first, to FIG. 1 thereof, there is shown therein a printing-press configuration having an open-sheet delivery 1, ahead or upstream of which, as viewed in the travel direction of a material web 2 from the left-hand side to the right-hand side of FIG. 1, a printing unit 11 of a rotary printing press is disposed. The web 2 is printed on both sides thereof in the printing unit 11, and is cut into individual sections 3 in the open-sheet delivery 1 by a cutting cylinder 5, which cooperates with a stationary bottom knife 4. The material web 2 is transported by draw rollers 6, and the cut sections 3 are transported by conveying rollers 7, the respective rollers 6 and 7 cooperating with respective counter-pressure rollers 8 disposed opposite thereto. The cutting cylinder 5 and the draw roller 6 each have their own drive. A rotary-position sensor 10 is assigned to the printing-unit cylinders of the printing unit 11; the angular position of the draw roller 6 being scannable through the intermediary of a rotary-position sensor 12, and the rotary position of the cutting cylinder 5, which is provided with at least one cutting blade, as shown in FIG. 1, is scannable through the intermediary of a rotary-position sensor 24. A sensor 9 is disposed in front of or before the bottom knife 4 and the cutting cylinder 5 cooperating therewith, as viewed in the web travel direction, it being totally irrelevant whether the sensor 9 is disposed above or below the material web 2 as it enters the open-sheet delivery 1.

Figure 2:
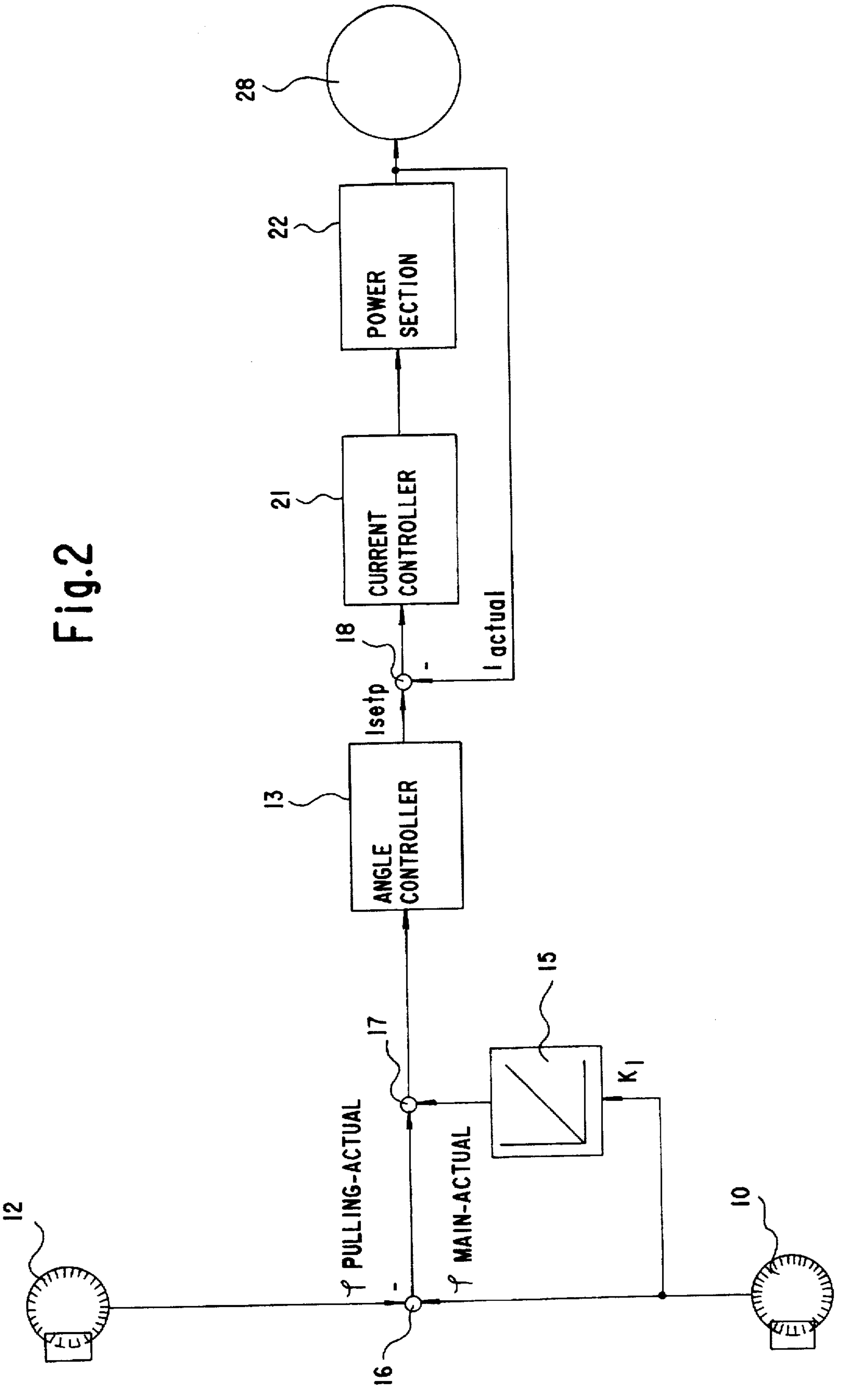
FIG. 2 is a circuit diagram of a control loop for a drive of web pulling or drawing devices.

FIG. 2 illustrates a control loop for a respective drive of the pulling or drawing devices 6,8 and 7,8.

A signal $\phi_{pulling\text{-}actual}$ or $\phi_{drawing\text{-}actual}$ from a rotary-position sensor 12 of the pulling or draw roller 6 is relayed to a signal node 16. A signal $\phi_{main\text{-}actual}$ is likewise transmitted to the signal node 16 from the rotary-position sensor 10 of the printing unit 11. Following the merging of both signals, one of which has a negative sign, the resulting angle signal is relayed to a node 17. At the node 17, a further signal, which is formed in the hereinafter-described manner, is added to the resulting signal. From the rotary-position sensor 10 of the printing unit 11, the signal $\phi_{main\text{-}actual}$ is, on the one hand, relayed directly to the signal node 16, and also, on the other hand, as indicated herein by a proportionality constant $K_I$, has a rotational speed-dependent, ramp-like rising difference signal 15 added thereto before it is applied to the node 17. The addition of the difference signal 15 is effected in a manner dependent upon rotational speed, so that the slope of the characteristic curve shown in FIG. 2 merely reflects the course of one characteristic curve out of a family of characteristic curves.

The signal determined at the node 17 from the signals $\phi_{pulling\text{-}actual}$, $\phi_{main\text{-}actual}$ and $\phi_{main\text{-}actual}$ as modified by $K_I$, represents an input variable, which is fed as an input signal into an angle controller in the form of a signal converter 13, wherein the input signal is converted into an output signal, i.e., a nominal or setpoint current $I_{setpoint}$, corresponding to the calculated angular deviation. Through the intermediary of a current controller 21, which controls a power section 22, the motor torque of a drive 28 is regulated by the current $I_{setpoint}$. The actual current $I_{actual}$ is fed back with a negative sign to a signal node 18 located between the signal converter 13 and the current controller 21. If the control deviation between the setpoint current $I_{setpoint}$ and the actual current $I_{actual}$ is equal to 0, then ideal conditions prevail. If, on the other hand, an angular deviation is detected through the intermediary of the rotary-position sensors 10 and 12, a nominal or setpoint current $I_{setpoint}$ suitable to compensate for the angular deviation is computed and matched through the intermediary of the current controller 21 and, accordingly, immediately influences the motor operating torque of the motor driving torque of the drive 28. In this manner, a web tensioning which is dependent upon the rotational speed of the printing-unit cylinders of the printing unit 11 is maintained, with interference variables being controllably stabilized directly.

Figure 3:
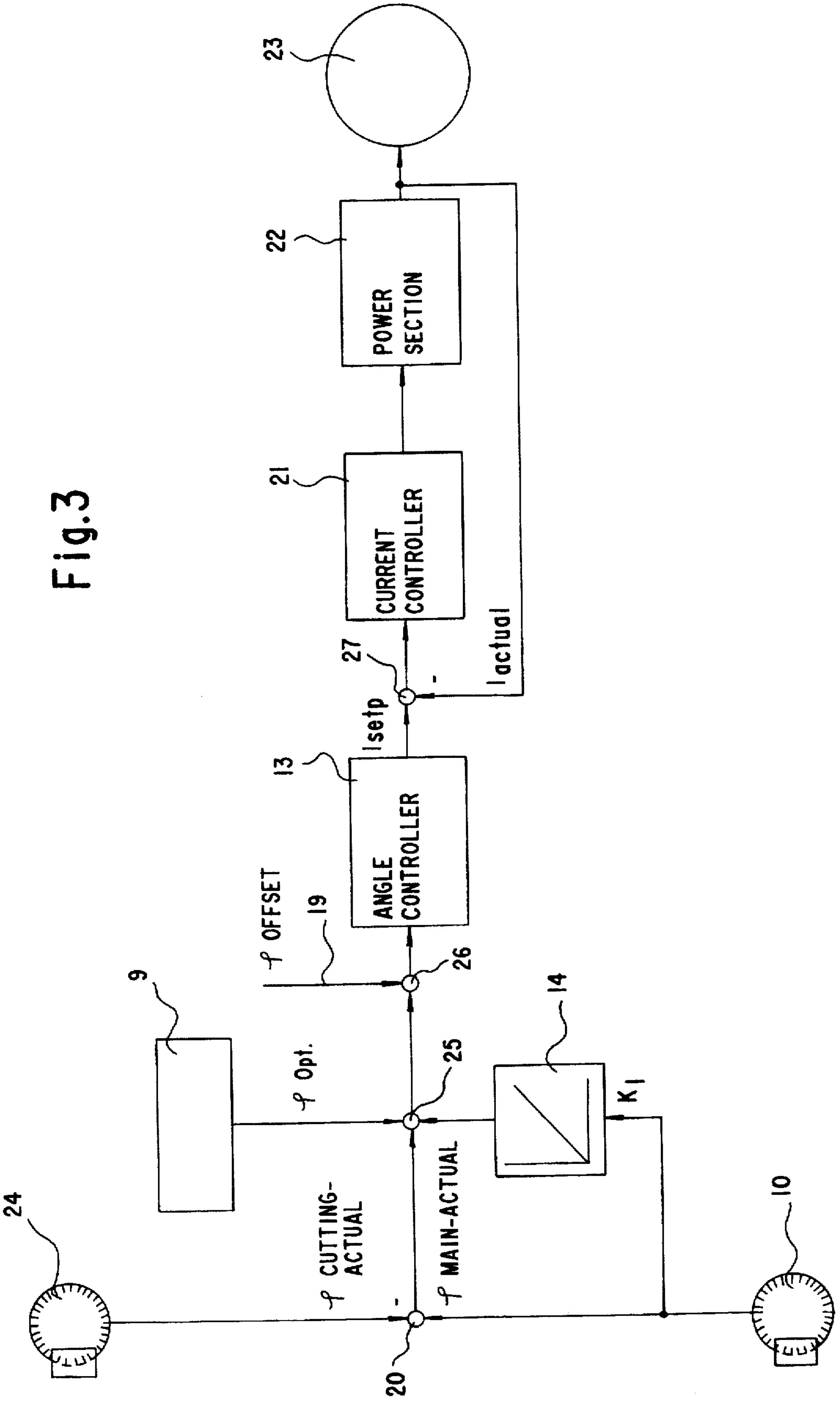
FIG. 3 is a circuit diagram like that of FIG. 2 of a control loop for a drive of a cutting cylinder.

FIG. 3 illustrates a control loop for a drive of the cutting cylinder 5.

From the rotary-position sensor 24 of the cutting cylinder 5, a signal $\phi_{cutting\text{-}actual}$, indicating the actual rotary position of the cutting cylinder 5, with a negative sign, is transmitted to a node 20. The signal $\phi_{main\text{-}actual}$ from the rotary-position sensor 10 of the printing unit 11 is, on the one hand, fed to the node 20 and, on the other hand, has a rotational speed-dependent, ramp-like rising difference signal 14, indicated herein by the proportionality constant $K_I$, added thereto to form a further signal at a node 25. In this case, for example, the characteristic curve of the difference signal 14 as shown in FIG. 3 is more closely characterized by the proportionality factor $K_1$. At the node 25, a signal $\phi_{opt}$ from the sensor 9 is superimposed upon the rotational speed-dependently calculated difference signal 14, the signal $\phi_{cutting\text{-}actual}$ and the signal $\phi_{main\text{-}actual}$. The sensor 9 detects the occurrence of any shift in the position of the printed image on the material web 2, for example, due to variations in paper quality. Thus, four input signals are merged at the node 25, and the result of the merger thereof is relayed to a node 26. In generalized terms, it may be said that the signals $\phi_{cutting\text{-}actual}$, $\phi_{main\text{-}actual}$, $\phi_{opt}$ and the rotational speed-dependent, ramp-like difference signal 14 formed as a function of the printing-press speed $\phi_{main\text{-}actual}$ at the node 25, all of which were considered hereinbefore, are continuously transmitted during the production run and are thus available as input variables for angular feedback control. This is not true for the setting input 19 $\phi_{offset}$. When the printing-press configuration is being set up, $\phi_{offset}$ is inputted by the pressman so that the web cut-off is at the border of a printed section. When a steady state has been established, after production has run up to speed, the setting input 19 $\phi_{offset}$ becomes irrelevant, and feedback control occurs automatically based upon the aforementioned continuously transmitted input variables.

The signal which is fed to the signal converter 13 is generated at the node 26; depending upon the input signal of the determined angular deviation, a nominal or setpoint current $I_{setpoint}$ is calculated and is relayed via a current controller 21 to a power section 22, which, in turn, influences the motor torque of the drive 23 of the cutting cylinder 5. An actually flowing motor current $I_{actual}$ is fed back to a node 27. If the control deviation is 0, there is no need for any feedback control. Only if the signals from the sensor 9 indicate a shift in the position of the printed image, or if there are differences in the signals $\phi_{cutting\text{-}actual}$ and $\phi_{main\text{-}actual}$ is there a change in the input variable fed to the signal converter 13 from the node 26. Then, the nominal motor current $I_{setpoint}$ is varied accordingly, which results in a change in the motor torque of the drive 23 of the cutting cylinder 5. The cutting position between the cutting cylinder 5 and the bottom knife 4 is thereby, in turn, shifted with respect to the moving material web 2. Through the introduction of a high-resolution sensor 9, it is possible to keep the cutting register within a range of tenths of a millimeter in spite of the occurrence of disturbance variables, such as varying paper quality.

A web tensioning or tautening which is dependent upon rotational speed can be maintained by means of the two independent control loops for the drives 23 and 28 without adversely affecting the accuracy or precision of the cut-off. The accuracy or precision of the cut-off, in turn, is not diminished by variations in paper quality, because the sensor 9 immediately detects any shift in the position of the printed image and exerts an influence upon the input variable of the control loop of the cutting-cylinder drive 23.

We claim:

1. In a cross-cutter of a rotary printing press for printing on a printing-carrier web, the cross-cutter having a driven cutting cylinder, and the rotary printing press having printing-unit cylinders, drawing devices for the printing-carrier web and positioning devices for adjusting the position of the printing-carrier web, the improvement comprising: a cutting-register feedback-control device including a plurality of rotary sensors respectively coupled to the printing-unit cylinders for monitoring angular positions of the cylinders and to a cutting cylinder for sensing the angular position of the cutting cylinder, the rotary sensors being connected to a first one of at least two summing circuits; and control circuits operatively connected with the positioning devices for the printing-carrier web so as to effect a correction in a position of the printing-carrier web if there should be an angular deviation between the printing-unit cylinders and the driven cutting cylinder, the cutting-register feedback-control device including further rotary-position sensors for sensing the angular positions of the drawing devices, a first control loop for a drive of the drawing devices, said rotary sensors for the printing-unit cylinders and for the drawing devices being connected in said first control loop, a second control loop for a drive of the cutting cylinder wherein said first and second control loops are mutually coupled by an angle controller operative for maintaining synchronization between said printing-unit cylinders and said cutting cylinder, wherein the cutting cylinder is disposed in an open-sheet delivery of the printing press, and including another sensor for detecting a printed-image position on the printing-carrier web, said other sensor being disposed upstream of the cutting cylinder, as viewed in a travel direction of the printing-carrier web through the printing press, and, wherein said other sensor, said rotary-position sensor for the cutting cylinder and said rotary-position sensor for the printing-unit cylinders are mutually connected so that a signal $\phi_{opt}$ of said other sensor is feedable to superimposed signals $\phi_{cutting\text{-}actual}$ of said rotary-position sensor for the cutting cylinder and $\phi_{main\text{-}actual}$ of the rotary-position sensor for the printing-unit cylinders.

2. A cutting-register feedback-control device according to claim 1, including means for calculating a rotational speed-dependent difference signal dependent upon a signal $\phi_{main\text{-}actual}$ generatable by the rotary-position sensor of the printing-unit cylinders.

3. A cutting-register feedback-control device according to claim 1, including means for calculating a rotational speed-dependent difference signal dependent upon said signal $\phi_{main\text{-}actual}$ of the rotary-position sensor for the printing-unit cylinders, and means for combining said signals $\phi_{cutting\text{-}actual}$, $\phi_{main\text{-}actual}$ and $\phi_{opt}$ with said rotational speed-dependent difference signal into an input signal to a node of said second control loop.

4. A cutting-register feedback-control device according to claim 1, including means for manually preselecting a signal $\phi_{offset}$ representing a phase position of the cutting cylinder as a setting input to said second control loop.

5. A cutting-register feedback-control device according to claim 1, including a signal converter for said second loop, and means for feeding back a current $I_{actual}$ of said drive of the cutting cylinder to a node disposed after said signal converter in said first and said second loops.

6. A cutting-register feedback-control device according to claim 1, including means for feeding a signal zpulling-actual from said rotary-position sensor for the drawing devices and a signal $\phi_{main\text{-}actual}$ from said rotary-position sensor for the printing-unit cylinders to a node of said first control loop.

7. A cutting-register feedback-control device according to claim 6, including means for superimposing a rotational speed-dependent, rising difference signal on said signal $\phi_{main\text{-}actual}$ from said rotary-position sensor for the printing-unit cylinders, and means for feeding a resultant signal thereof to said node.

8. A cutting-register feedback-control device according to claim 7, including a signal converter for said first control loop, means for feeding said resultant signal from said node to said signal converter for converting said resulting signal into a current $I_{setpoint}$, means for outputting said current $I_{setpoint}$ as an input signal to another node after-connected to said signal converter, and means for feeding back to said other node a current $I_{actual}$ of a drive of the drawing devices.

* * * * *